United States Patent [19]

Jones

[11] Patent Number: 5,699,418
[45] Date of Patent: Dec. 16, 1997

[54] TELEPHONE CIRCUIT

[75] Inventor: David Richard Jones, Pencisely, United Kingdom

[73] Assignee: Northern Telecom Limited, Montreal, Canada

[21] Appl. No.: 620,414

[22] Filed: Mar. 22, 1996

[30] Foreign Application Priority Data

Mar. 24, 1995 [GB] United Kingdom ............ 9506027

[51] Int. Cl.⁶ .............. H04M 1/56; H04M 15/06; H04B 13/02; H03D 3/18
[52] U.S. Cl. .............. 379/142; 379/215; 379/372; 379/96; 379/98; 375/222; 375/327; 375/376
[58] Field of Search .............. 379/93, 95, 96, 379/97, 98, 127, 142, 157, 201, 215, 372, 373, 376, 377; 375/222, 327, 376; 370/261, 522, 526

[56] References Cited

U.S. PATENT DOCUMENTS

| | | | |
|---|---|---|---|
| 4,369,338 | 1/1983 | Soulliard | 179/84 VF |
| 4,677,663 | 6/1987 | Szlam | 379/211 |
| 4,860,340 | 8/1989 | Suzuki | 379/74 |
| 5,263,084 | 11/1993 | Chaput et al. | 379/215 |
| 5,537,448 | 7/1996 | Schwarz et al. | 375/376 |
| 5,574,777 | 11/1996 | Lewis | 379/142 |

FOREIGN PATENT DOCUMENTS 36 30 471 4/1988 Germany.

*Primary Examiner*—Curtis Kuntz
*Assistant Examiner*—Paul Loomis
*Attorney, Agent, or Firm*—Lee, Mann, Smith, McWilliams, Sweeney & Ohlson

[57] ABSTRACT

A single phase locked loop based device is used to detect alert tones and to decode data in caller display services signalling systems. The device has two sets of components (resistors) to configure the device to perform tone detection and data decoding. One or both of the sets of components are connected to the device by an electronically controlled switch.

8 Claims, 2 Drawing Sheets

TELEPHONE CIRCUIT

This invention relates to a circuit for use in a subscriber's telephone terminal.

BACKGROUND OF THE INVENTION

Several types of signalling systems are used in telephone networks. In addition to signalling to establish a route through the network, there are signalling systems to provide a range of caller display services in the local loop of a network. These services include Calling Line Identification (CLI) which displays the number of a caller on the terminal of the called subscriber, and may be combined with call blocking to refuse anonymous calls or calls from a particular number.

There are several different caller display services standards, the main standards in the United Kingdom being those of British Telecom and the Cable Television Association. When a call is made according to one of these standards, there is some indication that caller display information is present (an alert signal) and then the caller display data is sent, prior to ringing. The Cable Television Association's standard is based on North American standards, and uses a short ringing burst as an alert signal followed by frequency shift keyed (FSK) data. This standard is commonly known as Custom Local Area Signalling System (CLASS).

The British Telecom standard, also adopted by the European Telecommunications Standards Institute (ETSI), uses a line reversal and two discrete voice-band tones as an alert signal, followed by FSK caller display data.

Subscriber terminals must detect the alert signal and decode the caller display data.

Custom designed devices are available for the CTA standard e.g. Motorola™ MC145447, EXAR T66100 but these do not perform tone detection and so cannot be used with the British Telecom standard.

One integrated device which has only recently become available, and is therefore costly, performs tone detection and data decoding, using discrete (resistor, capacitor) filters for the tone detection. It is also known to use a phase-locked loop based circuit as a tone detector in combination with another device, such as one of those for the CTA standard, to decode FSK data, but this requires two devices which adds cost and scale to the solution.

The object of the present invention is to provide a cost-effective solution to alert tone detection and data decoding which overcomes the problems of the above arrangements.

SUMMARY OF THE INVENTION

According to the present invention there is provided a circuit for processing telephone signalling information comprising sequentially sent alert tones and tone data, the circuit comprising a single phase-locked loop based device which has an input to receive the signalling information, there being a first and a second set of components associated with the device to configure the device respectively for alert tone detection and tone data decoding, there being a switch arranged to connect the first and/or second sets of components to the device depending on whether tone detection or data decoding is required.

According to another aspect of the present invention there is provided a method of processing telephone signalling information comprising sequentially sent alert tones and tone data, the method comprising the steps of passing the signalling information through a single phase-locked loop based device which has a first and a second set of associated components to configure the device to respectively detect the alert tones and to decode the tone data, and switching to connect the first and/or second sets of components to the device depending on whether tone detection or data decoding is required.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
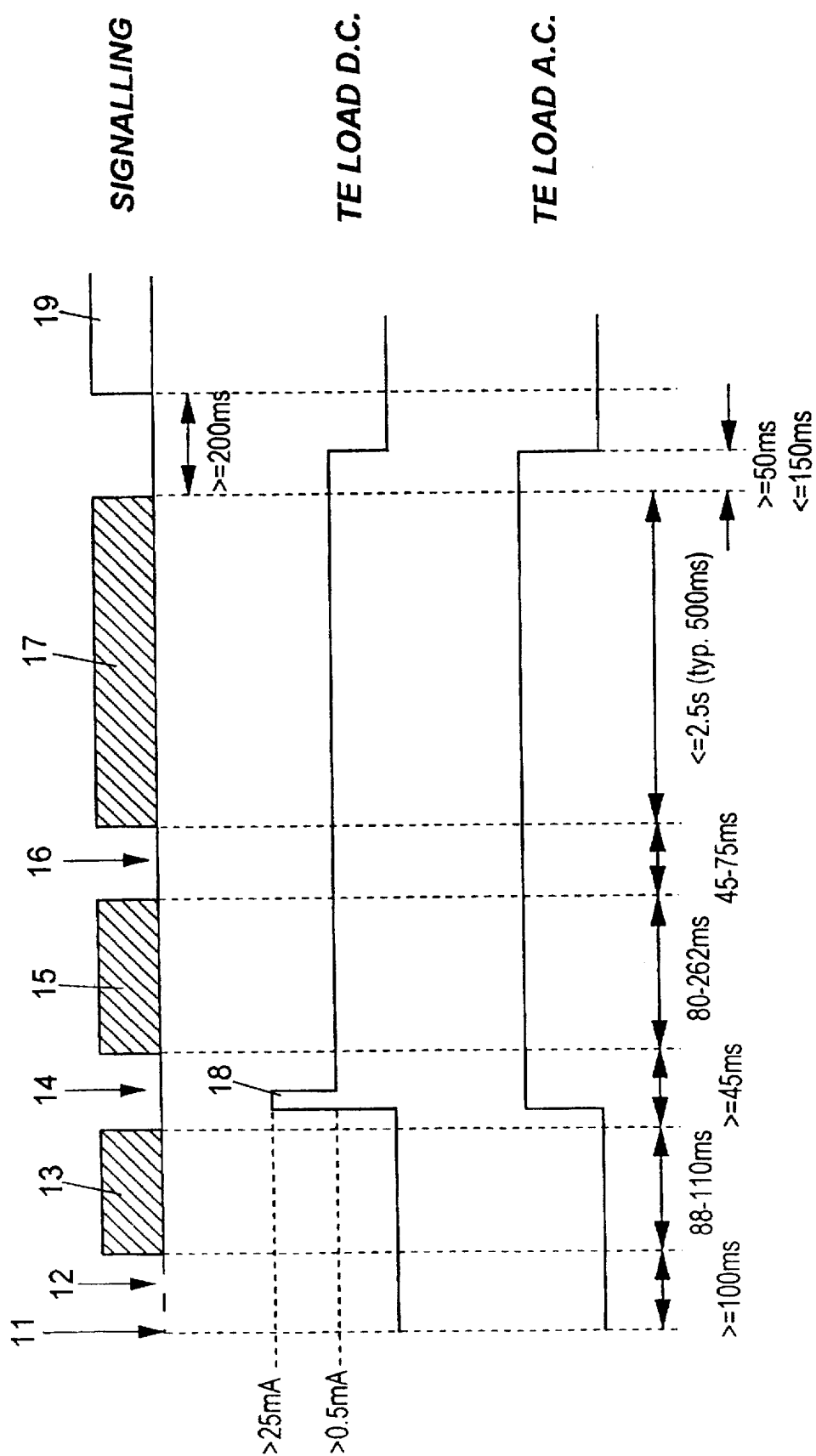
FIG. 1 shows the format of one type of caller display signalling.

FIG. 1 shows caller display signalling according to the British Telecom/ETSI standard.

An incoming call to a subscriber terminal equipment (TE) begins with a line polarity reversal 11, a first silence period 12, and an alert tone signal 13. The alert tone signal comprises the tones 2130 Hz and 2750 Hz. A second silence period 14 allows the terminal equipment time to respond with a current wetting pulse 18 and ac and dc loads. This is followed by a channel seizure message 15, a mark 16 and the caller display data 17. The data is sent using voice-band modem standard V.23, frequency shift-keyed (FSK) between 1300 Hz and 2100 Hz at a rate of 1200 baud. After a further silence the call arrival (ringing) 19 indication is sent.

The present invention is particularly concerned with detecting the alert tone signal 13 and decoding/demodulating the data 17 stages of the signalling.

Figure 2:
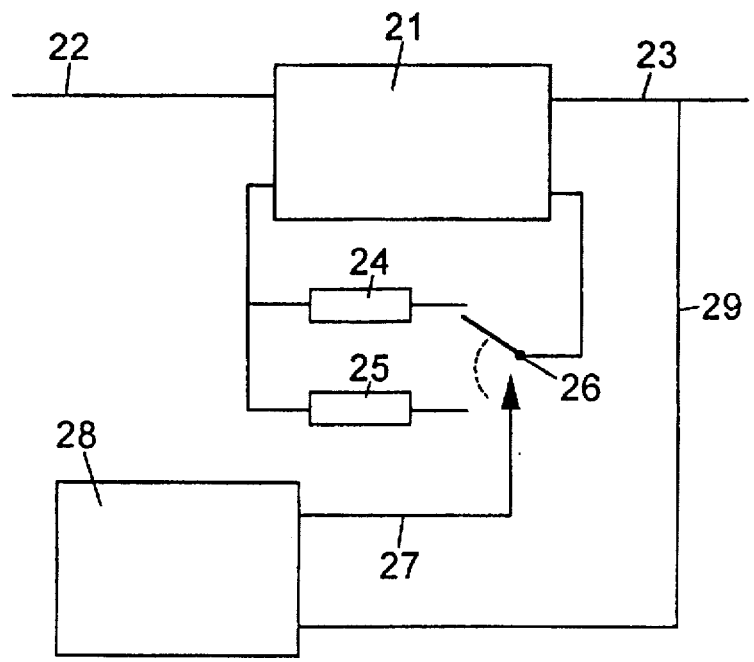
FIG. 2 is a schematic diagram of one embodiment of the invention.
Figure 3:
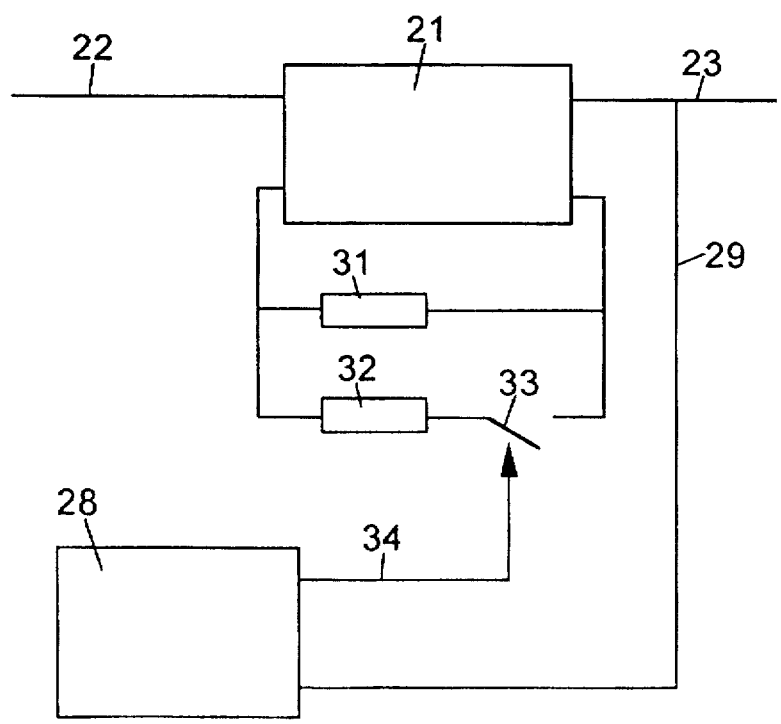
FIG. 3 is a schematic diagram of an alternative embodiment of the invention.

FIG. 2 and 3 schematically show circuits which provide tone detection and data decoding in accordance with the invention. The incoming signal 22 as previously described, passes through a single phase locked loop based device 21. A phase locked loop is capable of tone detection and, with the addition of a few extra components (i.e. a comparator, low-pass filter), FSK data decoding. Single integrated circuits are widely available to individually perform these tasks.

The tones used for the alert signal (2130 Hz, 2750 Hz) are of a higher frequency than those used for data transmission (1300 Hz, 2100 Hz). It is therefore necessary to configure device 21 for each of these tasks. Components e.g. resistors 24 (FIG. 2) and 31 (FIG. 3) configure device 21 for tone decoding, and components 25 (FIG. 2) and 32 (FIG. 3) configure device 21 for data decoding.

Configuring the device involves setting the VCO centre frequency and capture range of the phase locked loop.

Because the alert tones are sent in a different time period from the data, a single device can be used to perform both tone detection and data decoding, with a switch 26, 33 connecting the appropriate set of components to device 21 as required. Because of the short time period between the sending of the alert tone signal and the FSK data, the switching must be electronically controlled.

There may be separate sets of components to configure the device to perform each function, as with sets 24, 25 in FIG. 2 and a switch 26 to couple the appropriate set to the device 21. Alternatively, as in FIG. 3 a first set of components 31 may be permanently connected to device 21 to configure the device for one of the functions and a second set of components 32 connected in parallel by switch 33 as required. The switch can be operated by a microprocessor under software control. It is intended that device 21 be set initially for alert tone detection in anticipation of an incoming call, and that subsequently the switch is operated to configure the device 21 for data decoding.

The decision as to when to switch from tone detecting to data decoding is decided by software of a controlling microprocessor 28. A microprocessor is already present in the telephone set, and can be used to perform this switching function by adding some extra code to the control software. A feedback signal 29 from output 23 of circuit 21 is fed to microprocessor 28 to allow the microprocessor to decide when to issue a control signal 27,34 to the switch.

The switch may comprise one or more transistors placed in series with the components.

A suitable phase locked loop based device to which the invention may be applied is the EXAR XR-2211.

For tone detecting a narrow capture bandwidth and a high VCO free-running frequency are required. For data decoding a wider capture bandwidth (at least wide enough for the FSK frequencies plus tolerance) and lower VCO free-running frequency (1700 Hz) are required.

The BT standard permits a single or dual alert tone signal. In a preferred embodiment a single alert tone is detected, which is the lower of the two possible tones (2130 Hz rather than 2750 Hz). This is because filtering in the terminal prevents spurious signals above the speech band passing to the subscriber, which reduces the level of the higher 2750 Hz tone.

A protocol called ADSI (Analog Display Services Interface) also uses two voice-band alert tones followed by tone data to provide off-hook signalling. This signalling can be used to provide call waiting information to a subscriber who is currently involved with a call. The processing circuit described here could be used with the ADSI protocol.

I claim:

1. A circuit for processing telephone signalling information comprising sequentially sent alert tones and tone data, the circuit comprising a single phase-locked loop based device which has an input to receive the signalling information, there being a first and a second set of components associated with the device to configure the device respectively for alert tone detection and tone data decoding, there being a switch arranged to connect the first and/or second sets of components to the device depending on whether tone detection or data decoding is required.

2. A circuit according to claim 1 wherein the switch is electronically controlled.

3. A circuit according to claim 1 wherein the components configure a centre frequency and capture range of the phase-locked loop based device.

4. A circuit according to claim 1 wherein the first and second sets of components are connected in parallel, the first set of components being permanently connected to the device to configure it for tone detection and the switch additionally connecting the second set of components to the device to configure it for data decoding.

5. A circuit according to claim 1 wherein the signalling information comprises caller display service data.

6. A telephone comprising a circuit according to claim 2 and a control microprocessor which is arranged to receive a feedback signal from the output of the circuit and to issue a control signal to the switch.

7. A method of processing telephone signalling information comprising sequentially sent alert tones and tone data, the method comprising the steps of passing the signalling information through a single phase-locked loop based device which has a first and a second set of associated components to configure the device to respectively detect the alert tones and to decode the tone data, and switching to connect the first and/or second sets of components to the device depending on whether tone detection or data decoding is required.

8. A method according to claim 7 wherein the signalling information comprises caller display service data.

* * * * *